Aug. 14, 1934.  E. C. HEAD  1,969,843
CUTTER FOR AND METHOD OF CUTTING GEARS
Filed Jan. 2, 1931   7 Sheets-Sheet 1

INVENTOR
Ernest C. Head.
BY
his ATTORNEY

Aug. 14, 1934.  E. C. HEAD  1,969,843
CUTTER FOR AND METHOD OF CUTTING GEARS
Filed Jan. 2, 1931  7 Sheets-Sheet 2

INVENTOR
Ernest C. Head.
BY /s/ Schlesinger
his ATTORNEY

Aug. 14, 1934.  E. C. HEAD  1,969,843
CUTTER FOR AND METHOD OF CUTTING GEARS
Filed Jan. 2, 1931  7 Sheets-Sheet 3

INVENTOR
Ernest C. Head
BY
his ATTORNEY

Aug. 14, 1934.   E. C. HEAD   1,969,843
CUTTER FOR AND METHOD OF CUTTING GEARS
Filed Jan. 2, 1931   7 Sheets-Sheet 4

INVENTOR
Ernest C. Head
BY
his ATTORNEY

Aug. 14, 1934.  E. C. HEAD  1,969,843
CUTTER FOR AND METHOD OF CUTTING GEARS
Filed Jan. 2, 1931   7 Sheets-Sheet 5

INVENTOR
Ernest C. Head
BY
his ATTORNEY

Aug. 14, 1934.  E. C. HEAD  1,969,843
CUTTER FOR AND METHOD OF CUTTING GEARS
Filed Jan. 2, 1931  7 Sheets-Sheet 6

INVENTOR
Ernest C. Head
BY
his ATTORNEY

Aug. 14, 1934.  E. C. HEAD  1,969,843
CUTTER FOR AND METHOD OF CUTTING GEARS
Filed Jan. 2, 1931   7 Sheets-Sheet 7

INVENTOR
Ernest C. Head
BY /s/ B. Schlesinger
his ATTORNEY

UNITED STATES PATENT OFFICE 1,969,843

CUTTER FOR AND METHOD OF CUTTING GEARS

Ernest C. Head, Rochester, N. Y., assignor to Gleason Works, Rochester, N. Y., a corporation of New York Application January 2, 1931, Serial No. 506,094

21 Claims. (Cl. 90—4)

The present invention relates to the manufacture of longitudinally curved tooth gears and particularly to the cutting of such gears in a continuous indexing process with a face mill type of cutting tool.

The standard method of cutting longitudinally curved tooth gears with a face mill cutter is by the intermittent indexing process. In this process, each tooth space or tooth face of the gear blank is completed before the cutting operation begins on the next tooth space or face, the blank being withdrawn relative to the tool and indexed between cutting operations.

It is also known that longitudinally curved tooth gears can be cut with a face mill cutter in a continuous indexing process, namely, in a process in which the blank and cutter rotate continuously in engagement and the blank is given a continuous indexing rotation so that different blades of the cutter operate successively in different tooth spaces of the blank. In this latter process, all of the teeth of the blank are operated on simultaneously and finished substantially simultaneously, the blank and cutter remaining in engagement until the gear is completed. There are no periodic withdrawals for indexing and the time lost in the standard process through these periodic withdrawals is saved.

The face mill hobbing process, as the continuous indexing method of cutting with a face mill is called, has theoretically the advantages over the standard face mill cutting process not only of faster production but also of greater accuracy in tooth spacing. But the development of the face mill hobbing process has been hindered up to the present by the fact that cutting tools, as heretofore made for carrying out the process, have been subject to such practical objections as to overweigh the obvious merits of the process itself. It is the continuous rotation of the blank which causes the difficulty as regards the cutting tools, for this continuous rotation causes the clearance between the cutting blades and the sides of the tooth being cut to change continuously as the cutting blades move across the face of the blank and, moreover, to change differently on the two sides of the teeth, for the blank is rotating away from one side of a cutting blade and into the other side of the blade as the blade takes its cut across the face of the blank.

A standard face mill gear cutter would not do for the continuous indexing process for then there would be too much clearance on one side of the cutting blade and not enough on the other. Patent No. 1,249,378 issued December 11, 1917 to James E. Gleason et al. discloses a face mill hobbing cutter which meets the requirement as to cutting clearance on both sides of the blades but this form of cutter is open to the practical objection that the blade has to be adjusted radially of the cutter head after each sharpening. In this cutter, the desired cutting clearance is obtained by relieving the sides of the cutting blades on arcs of roulettes but the result is that the blades are offset rearwardly, that is, radially with reference to the paths of their cutting edges. Hence, when the tool is sharpened each of the blades has to be adjusted radially of the axis of the cutter to bring the new cutting edges into the radial positions occupied by the original cutting edges. As against the standard face mill cutter in which the blades do not have to be adjusted after sharpening, this requirement for adjustment is a serious disadvantage particularly as the blades must be adjusted very accurately in a face mill hobbing cutter since their positions affect directly the spacing of the gear teeth. Moreover, there is the objection to the cutter of Patent No. 1,249,378 that new relieving machinery would be required in order to manufacture it.

Other proposals have been made for face mill hobbing cutters. One of these included the idea of employing cutting blades which were relieved in the same manner as standard face mill cutter blades and positioned in the cutter heads in a manner similar to standard cutting blades but which were made of considerably higher pressure angle than standard cutter blades and had considerable more top relief than standard cutting blades. This construction provided sufficient cutting clearance on the side of the blades which rotates into the blank during cutting but the clearance on the other side of the blades proved excessive. Then there was always the basic objection to this form of cutter that it could not be used to cut gearing of standard pressure angles.

Other proposals for face mill hobbing cutters have included the idea of making each of the cutting blades individually adjustable angularly in the cutter head but here practical difficulties are encountered in the mounting of the blades and again the blades require adjustment after they have been sharpened.

The primary purpose of the present invention is to provide a practical form of cutting tool for face mill hobbing gears. The invention includes, however, also, improvements in the gear cutting method and in the gears produced.

The cutting blades of a cutter constructed according to the present invention are similar in form to the cutting blades of a standard face mill gear cutter. Their rear ends are not offset from their front ends but lie behind their front ends circumferentially of the cutter. They may be relieved in the same way as are standard face mill cutter blades and they may be relieved on standard face mill cutter relieving machines. Thus, their top edges are measured from front to rear at a constant radial distance from the axis of the cutter. They differ from standard cutter blades in that the pressure angles of opposite sides of the blades are widely different. The cutting clearance is obtained by increasing the pressure angle on the side of the blades which rotates into the blank during cutting, while, to enable gears of standard pressure angles to be cut, the opposite sides of the blade are formed with a proportionately decreased pressure angle as compared with standard cutting blades. In use, then, gears of the desired pressure angle can be cut by tilting the tool angularly in the cutting machine until both sides of the cutting blades are positioned to cut surfaces of the desired pressure angles on both sides of the gear teeth. I have provided, therefore, a cutter of simple construction, which can be made upon existing machinery and whose blades have the required cutting clearance on both sides and do not have to be adjusted after sharpening, and which can cut gears of any pressure angle.

I have found that sufficient cutting clearance can be obtained on the low pressure angle side of the blades even though the pressure angle is distinctly lower than the pressure angle to be cut. In fact, the pressure angle of one side of the blade can be made zero or even a negative pressure angle and still sufficient cutting clearance obtained. By making the pressure angle zero, one side of the cutting blades can be formed as a section of a cylinder. Thus, this side of the blades can be ground on a cylindrical grinder and it is only necessary to relief-grind one side and the tip.

The principal objects of the invention have already been described. Other objects of the invention will be apparent hereinafter from the specification and from the recital of the appended claims.

Reference will be had first to Figures 1 to 13 inclusive which illustrate the principles and theory underlying the present invention.

Figure 1:
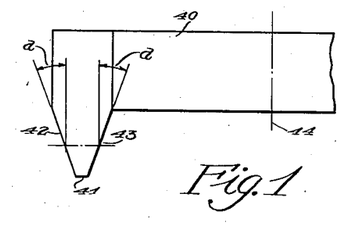
Figure 1 is a fragmentary axial sectional view, more or less diagrammatic, of a standard face mill gear cutter having blades whose outside and inside cutting edges are of equal pressure angles.

In order that the blades of a face mill gear cutter have the same effective cutting contour after sharpening as when new, the relieving motion used in relieving the two sides and the tips of the blades must be the same, that is, the same relieving cam must be employed to effect the side and top relief. The result of this relief is that each top edge of a blade is from front to rear at a constant radial distance from the center of the cutter. In a standard face mill gear cutter 40, the cutting blades 41 have equal pressure angles $a$ on the two sides 42 and 43 of the blade and this pressure angle is equal to the pressure angle of the teeth of the gear to be cut.

Figures 2, 3, 5, 6, 13:
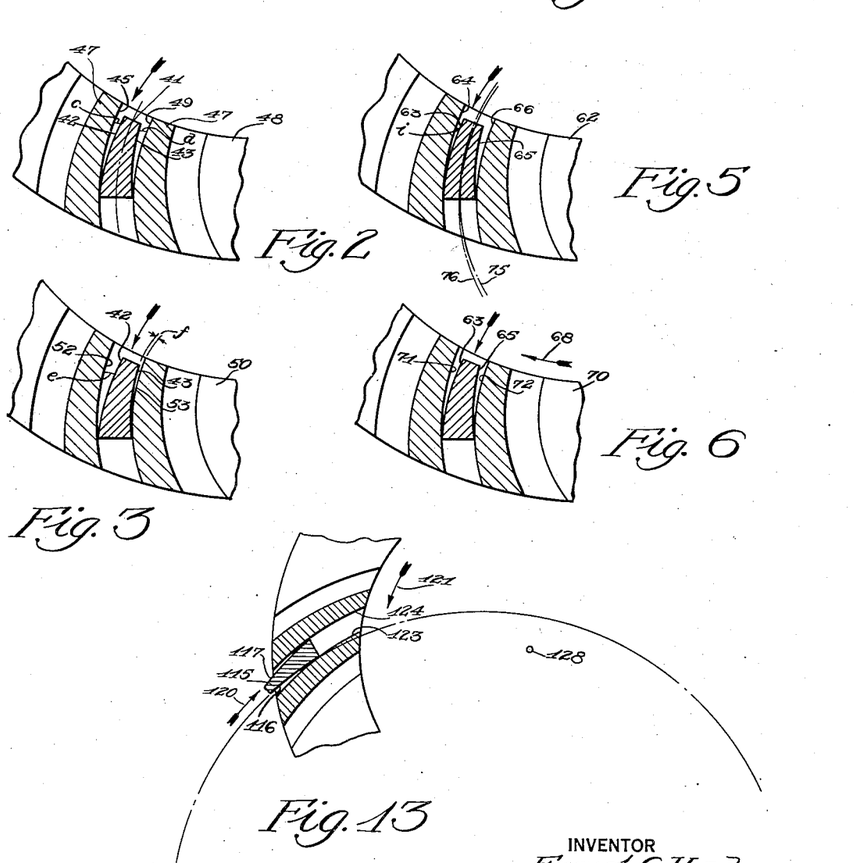
Figure 2 is a diagrammatic view illustrating the operation of this cutter in cutting a longitudinally curved tooth gear blank according to the intermittent indexing process.
Figure 3 is a diagrammatic view showing why such a cutter cannot be used in a continuous indexing process.
Figures 5 and 6 are diagrammatic views illustrating, respectively, how such a cutter would operate if cutting a gear according to the intermittent indexing process and how it may be employed to cut gears according to the continuous indexing process.
Figure 13 is a diagrammatic view corresponding to the view of Figure 12 but showing the directions of rotation of the cutter and blank when the low (zero) pressure angle side of the blade is on the inside instead of the outside of the blade.

The tip and the both sides of the blades are relieved, the sides of the blades being relieved on arcs of circles from front to back. In cutting a gear tooth according to the standard, that is, the intermittent indexing process, the cutter 40 rotates continuously on its axis 44 but the blank is stationary except for the generating roll. The outside cutting edges of the cutter will operate on the surfaces 45 of the teeth 47 of the blank 48 while the inside cutting edges will operate on the surfaces 49 of the teeth. The cutter and blank remain in engagement until the tooth space is cut to its full depth. Then the cutter is withdrawn and the blank indexed to bring the next tooth space into position for cutting. As the blank is stationary during cutting, except for the generating roll, the clearance angles $c$ and $d$ on the two sides of the cutting blades will be constant as the blades 41 move across the face of the blank taking their cuts. Hence by putting the proper side relief on the blades, a proper cutting action can be obtained.

In the face mill hobbing process, however, the blank has a continuous indexing rotation in addition to the generating motion and here the cutter rotates in timed relation with the blank. If the standard tool 40 having standard cutting blades 41 were used in such a process, it would be found that there was too much clearance on one side of the blade and too little clearance on the other. This is shown clearly in Figure 3. Here the gear blank 50 will be rotating continuously and the cutter 40 will be rotating in timed relation with the blank. If the rotation of the blank is away from the side 42 of the cutting blade, the clearance $e$ between the side 42 of the cutting blade and the side face 52 being cut thereby will be increased while the clearance $f$ between the side 43 of the cutting blade and the side face 53 of the blank will be reduced. As a result, there will be excessive clearance on the side 42 and insufficient clearance or even interference on the side 43. It will be evident, therefore, that the standard type of face mill gear cutter is not suitable for use in the hobbing or continuous indexing process.

Figure 4:
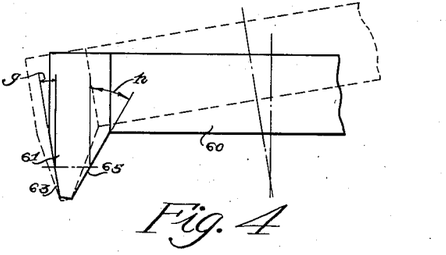
Figure 4 is a view corresponding to the view of Figure 1, showing a cutter having blades which are of greater than standard pressure angle on one side and less than standard pressure angle on the other.

Figure 4 shows a face mill gear cutter 60 which has cutting blades 61 which are of different pressure angles on opposite sides. The pressure angle $g$ of the outside cutting edges is less than the pressure angle $h$ of the inside cutting edges. If such a cutter, relieved in the usual way, is rotated in engagement with a gear blank 62 to cut teeth on the gear blank according to the intermittent indexing process, it will be found that there is too little clearance $i$ between the side 63 of the cutting blade and the tooth surface 64 being cut thereby while there will be excessive clearance between the side 65 of the cutting blade and the tooth surface 66 being cut thereby.

I have discovered how this difference in cutting clearance between the low and high pressure angle sides of the blade can be taken advantage of to permit of cutting longitudinally curved tooth gears in a continuous indexing process and with a practical form of cutting tool. If the blades 61 of the cutter 60 are of increased pressure angle on the side into which the blank rotates in the continuous indexing process, the increased pressure angle will give the cutting clearance required while by maintaining the same included angle between the sides 63 and 65 of the blades, as is included between the sides 42 and 43 of the standard cutter 40, gears of standard pressure angles can be cut. Thus, if the cutter 60 is rotated in engagement with the gear blank 70 to cut the blank according to the continuous indexing method, it will be seen that the rotation of the blank in the direction of the arrow 68 will provide sufficient clearance for the side 63 of the cutting blade 61 as it moves across the surface 71 of the blank while the increase in pressure angle of the side 65 of the blade will afford the required cutting clearance between the side 65 of the blade and the tooth surface 72 being cut thereby, despite the rotation of the blank into this side of the blade as the blade passes across the face of the blank. Now if the cutter 60 is tilted to the dotted line position shown in Figure 4 until the effective cutting pressure angles of the opposite sides 63 and 65 of the blades are equal to the pressure angles $a$ of Figure 1, the cutter 60 will cut gears of the same pressure angle as are cut by the cutter 40. As is clear, the tilting of the cutter 60 to the dotted line position will not affect the cutting clearance on either side of the cutting blade and the only effect of tilting the cutter will be to shift the center line of the cut. This is indicated in Figure 5 where 75 indicates the center of the tooth space and the line 76 indicates how the center of cut is shifted by the tilting of the tool.

Figure 7:
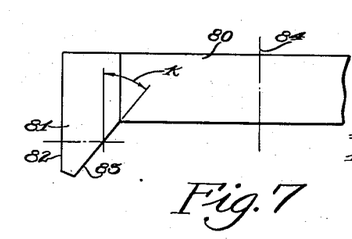
Figure 7 is a view corresponding to the view of Figure 1, showing a cutter which has blades that are of zero pressure angle on one side.
Figure 8:
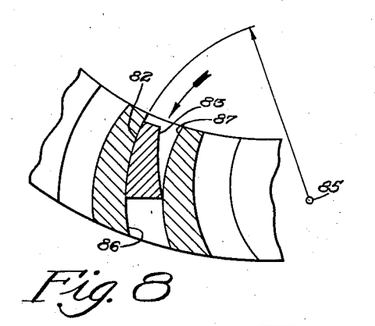
Figures 8 and 9 are diagrammatic views illustrating, respectively, why such a cutter would not be suitable for cutting gears according to the intermittent indexing process and how it may be employed to cut gears according to the continuous indexing process.
Figure 9:
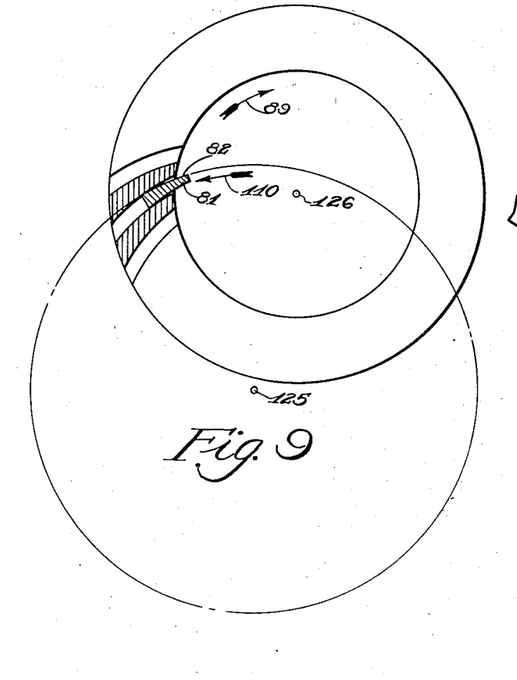

I have found that the pressure angles of the blades usable in a cutter constructed according to this invention are variable within wide limits. Thus the blades may have a zero or even a negative pressure angle on one side and a pressure angle increased on the opposite side, accordingly, to maintain the same included angle. Figure 7 shows the cutter 80 having cutting blades 81 which are of zero pressure angle on the outside and of proportionately higher pressure angle on the inside. The side 82 of the blade, which is the zero pressure angle side of the blade is parallel to the axis 84 of the cutter while the side 83 of the blade has a very large pressure angle $k$. With my invention, the zero pressure angle side of the blade can be made cylindrical. This is indicated in Figure 8 where it is shown that the side 82 is curved about the point 85 as a center. If an attempt were made to use such a cutter in an intermittent indexing process, it would be seen that such an attempt could only result in failure for the reason that there would be no clearance between the side 82 of the cutting blade and the tooth surface 86 being cut thereby while there would be excessive clearance between the side 83 of the cutting blade and the tooth surface 87 being cut thereby. But when the cutter 80 is used in a continuous indexing process as indicated in Figure 9, the rotation of the blank 88 in the direction of the arrow 89 provides sufficient cutting clearance between the zero pressure angle side 82 of the cutting blade and the tooth surface 90 being cut thereby while this same rotation reduces the clearance between the high pressure angle side 83 of the cutting blade and the tooth surface 91 being cut thereby to a practical amount. By tilting the cutter 80 to the pressure angle $a$ of the teeth to be cut, gears having teeth of the standard pressure angles can be cut.

Figure 10:
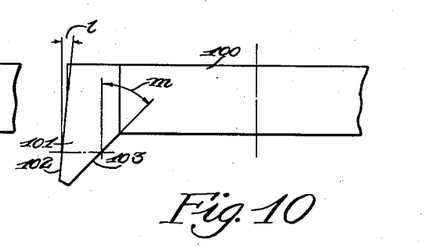
Figure 10 is a view corresponding to the view of Figure 1, showing a cutter having blades which are of negative pressure angle on one side.
Figure 11:
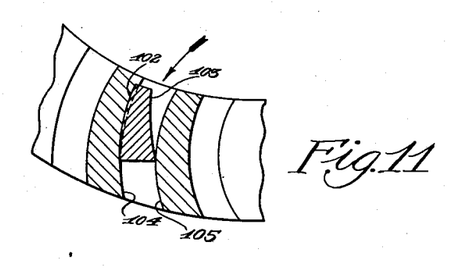
Figures 11 and 12 are diagrammatic views illustrating, respectively, why such a cutter would not be suitable for cutting gears according to the intermittent indexing process and how this cutter may be employed to cut gears according to the continuous indexing process.
Figure 12:
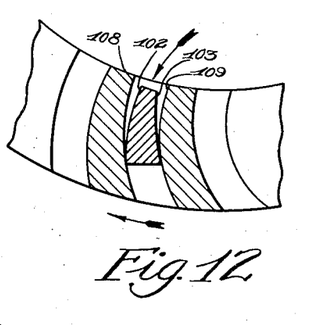

In Figures 10 to 12 inclusive, I have illustrated a cutter 100 which is provided with cutting blades 101 which are of negative pressure angle $l$ on the side 102 and of very high pressure angle $m$ on the opposite side 103. In the intermittent indexing process, the side 102 of the cutting blade would actually interfere with the tooth surface 104 while again the clearance between the inside cutting surface 103 and the tooth surface 105 would be excessive. But when this cutter is used in the continuous indexing process, the rotation of the blank will provide, as shown in Figure 12, sufficient clearance between the side 102 and the tooth surface 108 being cut thereby, while the clearance will be reduced between the side 103 and the tooth surface 109 being cut thereby to a satisfactory amount. As before, the desired pressure angle can be obtained by tilting the tool.

The need for properly selecting the direction of rotation of the cutter and the blank in using a cutter constructed according to this invention is clearly illustrated in Figure 13 when compared with Figure 9. Figure 9 shows a cutter having blades 81 whose outside surfaces 82 are cylindrical, that is, of zero pressure angle. To secure the desired cutting clearance, the cutter must be rotated in the direction of the arrow 110 while the blank is rotated in the direction of the arrow 89. In Figure 13 a cutter is illustrated which has cutting blades 115 whose inside faces 116 are cylindrical, that is, of zero pressure angle. The outside surfaces 117 of the blades, like the inside surfaces 83 of the cutter 80, have a pressure angle equal to twice the pressure angle of the gear to be cut if the gear teeth are to have equal pressure angles on both sides. To use the cutter with blades 115, both the cutter and blank must be rotated in the opposite directions, as indicated by the arrows 120 and 121, from those indicated in Figure 9. With the blank rotating in the direction of the arrow 121, it will roll away from the cylindrical surfaces 116 of the blades to provide the necessary cutting clearance between these surfaces and the tooth surfaces 123 being cut thereby while it will rotate into the sides 117 of the blade to reduce to a suitable amount the clearance between these sides 117 of the blade and the tooth surfaces 124 being cut thereby.

In Figure 9, 125 designates the axis of the cutter and 126 the center of the gear blank while in Figure 12, 127 designates the axis of the cutter and 128 the center of the gear blank.

Figure 14:
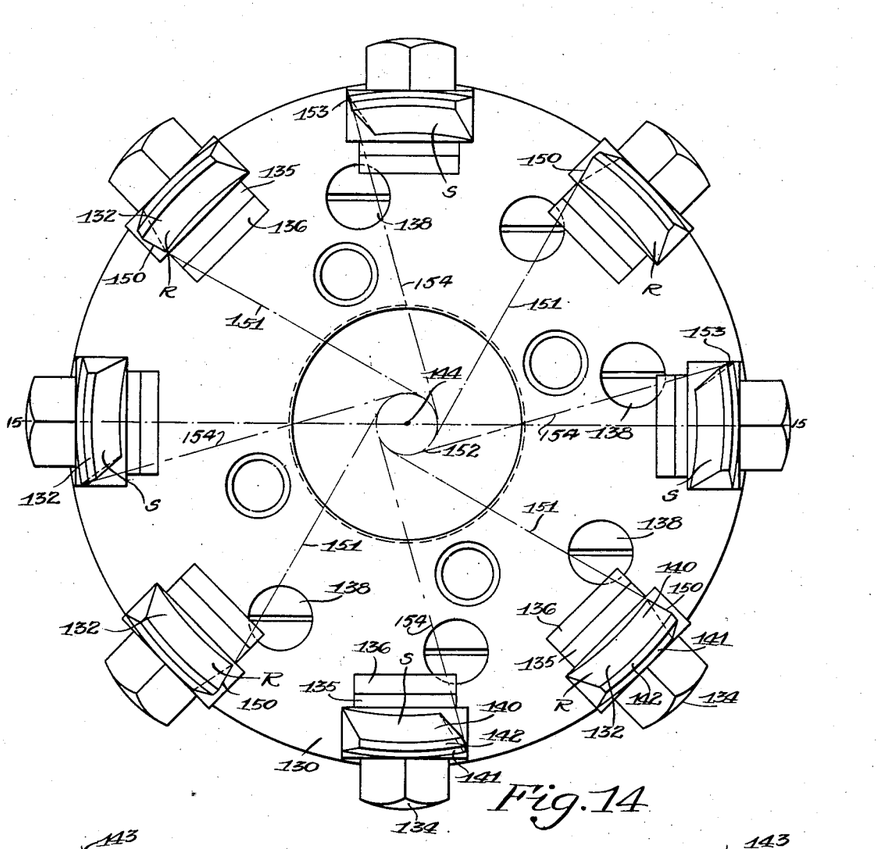
Figure 14 is a plan view of a face mill hobbing cutter constructed according to one embodiment of this invention and having blades which are of positive pressure angle on both sides.
Figure 15:
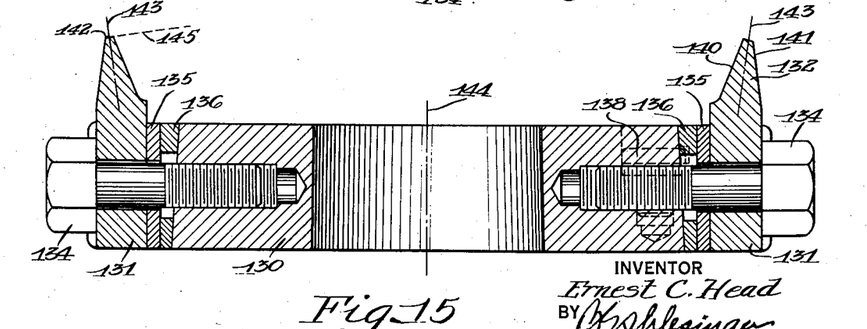
Figure 15 is a sectional view of this cutter taken on the line 15—15 of Figure 14.

In Figures 14 and 15, I have shown a face mill hobbing cutter constructed according to one embodiment of this invention and having blades which have positive but different pressure angles on their two sides. The cutter comprises a rotary cutter head 130 and a plurality of cutting blades which are secured in the cutter head. Each of the cutter blades includes a body or base portion 131 and a cutting portion 132. The cutter head is formed with a plurality of slots or grooves on its periphery in the same manner as a standard face mill gear cutter of the intermittent indexing type and the base or body portions 131 of the cutting blades are seated in these peripheral slots or grooves. The blades are secured to the cutter head by bolts 134 that pass through the body portions of the blades and thread into the cutter head. For the purpose of adjusting the blades radially in the cutter head, removable shims 135 and wedges 136 are provided. These are interposed between the inside faces of the body portions of the blade and the bottoms of the slots in which the blades are secured. The wedges are adjusted by adjustment of the screws 138 which thread into the cutter head 130 and have their heads engaging in notches in the sides of the wedges.

The described manner of securing the blades and adjusting them in the cutter head 130 is the present standard method of securing and adjusting blades in a face mill gear cutter of the intermittent indexing type. Like the standard face mill gear cutter, two of the blades may be fixed and the others made adjustable radially relative thereto. It will be understood that the particular form of blade securing and adjusting means shown forms no part of this invention and that other methods for securing and adjusting the blades upon the cutter head may be employed instead.

The cutting portions 132 of the blades are formed with inside and outside surfaces 140 and 141, respectively, and a tip surface 142. The blades of the cutter shown in Figures 14 and 15 have positive pressure angles on both their inside and outside surfaces but the blades are made so that the outside surface 141 of the blades is inclined to the axis of the cutter at an angle less than the pressure angle of the gear tooth surfaces to be cut thereby while the inside surfaces 140 of the blades are inclined to the axis of the cutter at an angle greater than the pressure angle of the gear tooth surfaces to be cut thereby. Thus, the median lines 143 of the blades are inclined to the axis 144 of the cutter.

The cutting portions of the blades are relieved on their side and tip surfaces from front to rear, the side surfaces being preferably relieved on the arcs of circles in the same manner as are the blades of a standard face mill gear cutter and, in fact, they may be relieved upon the same relieving machine. The tips 142 of the blades are relief-ground, however, so as to lie in planes 145 inclined at an acute angle to the axis 144 of the cutter. This is done so that the cutting blades will cut the teeth of the gear to full depth on both sides when the cutter is tilted relative to the blank.

The front faces of the cutting portions of the blades may be sharpened so that the blades have cutting edges on both sides or the blades may be sharpened and arranged in the cutting head so that alternate blades have opposite side cutting edges. The latter construction is illustrated in the drawings. Thus, the blades indicated at R in Figure 14 of the drawings are sharpened with a front rake or shear angle such that these blades have inside cutting edges while the blades indicated at S have their front faces sharpened with the opposite front rake or shear angle to provide outside cutting edges. Preferably the front rake or shear angles of the blades is made such, also, that the cutting edges of the blades lie in planes non-radial of the axis 144 of the cutter. Thus the inside cutting edges 150 lie in planes 151 tangent to the circle 152 circumscribed about the axis 144 of the cutter as a center while the outside cutting edges 153 lie in planes 154 tangent to this same circle 152. This method of sharpening the blades is different from the method of sharpening the standard face mill gear cutter for in the standard face mill gear cutter, the blades are sharpened so that the cutting edges are radial of the axis of the cutter. The purpose of the non-radial sharpening of the cutting edges of the face mill hobbing cutters is to secure the same normal pressure angle on the mating tooth surfaces of a pair of gears when cut with a pair of the new cutters.

Figure 16:
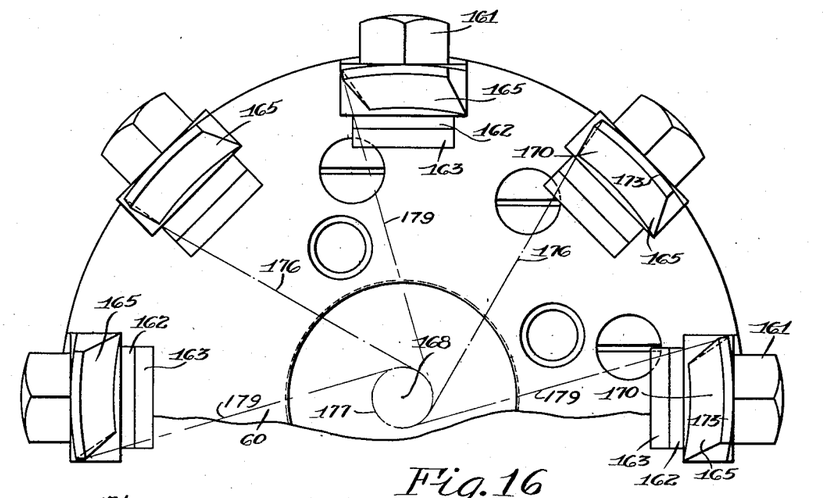
Figure 16 is a fragmentary plan view of a cutter constructed according to the invention and having blades which are of zero pressure angle on one side.
Figure 17:
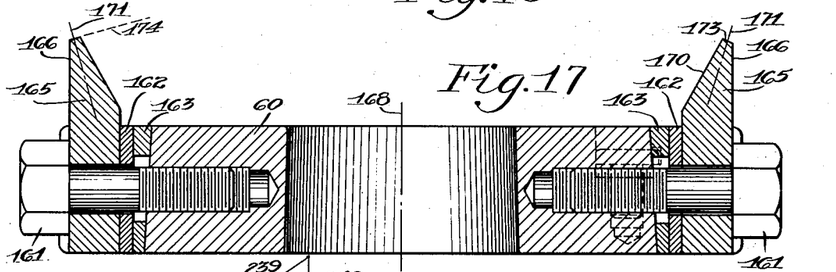
Figure 17 is a sectional view of the cutter shown in Figure 16 taken in a plane corresponding to that of Figure 15.

The cutter shown in Figures 16 and 17 is similar in construction to that shown in Figures 14 and 15 except that here one side of the blades is cylindrical, that is, of zero pressure angle. The cutter head 160 may be identical in construction with the cutter head 130 and the blades are secured to the cutter head by bolts 161 and adjusted radially of the cutter head by shims 162 and wedges 163 the same as before. The blades 165 of this cutter are relieved, however, on one side face and the tip only. In the cutter shown, the outside faces 166 of the blades are unrelieved. These outside surfaces 166 are cylindrical, sections of a cylinder. In the preferred construction, the axis of this cylindrical surface coincides with the axis 168 of the cutter and in this case the outside surfaces of the cutting blades can be ground on an ordinary cylindrical grinder with the blades in position in the cutter head. In any event, in this form of my cutter, the outside cutting edges of the cutting blades are parallel to the axis 168 of the cutter. The inside surfaces 170 of the cutting blades are accordingly inclined to the axis 168 of the cutter at an angle equal to twice the pressure angle of the gears to be cut, if the teeth of this gear are to have equal pressure angles on both sides. The median lines 171 of the cutting blades are inclined to the axis 168 of the cutter at an angle equal to the pressure angle of the gear teeth to be cut.

The inside faces 170 of the cutting blades 65 are preferably relieved on the arcs of circles from front to back in the same manner as are standard face mill cutter blades and they may be so relieved on standard face mill cutter relieving machines. The tip surfaces 173 of the blades 155 are also relieved back of the cutting edges and, as was the case with the cutter of Figures 14 and 15, the outermost points of the tip surfaces 173 lie in planes 174 inclined to the axis 168 of the cutter at an acute angle in order to cut to the full depth on both sides of a tooth space when the cutter is tilted.

As is the case with the cutter of Figures 14 and 15, the blades 165 of the cutter of Figures 16 and 17 are preferably sharpened and arranged so that alternate blades have opposite side cutting edges. As before, also, the blades are preferably sharpened with a front rake or shear angle such that the cutting edges of the blades are non-radial of the axis 168 of the cutter head. Thus, the inside cutting blades are sharpened so that the inside cutting edges lie in planes 176 which are tangent to a circle 177 circumscribed about the axis 168 of the cutter as a center, while the outside cutting blades are so sharpened that the outside cutting edges lie in planes 179 tangent to this same circle 177.

Figure 18:
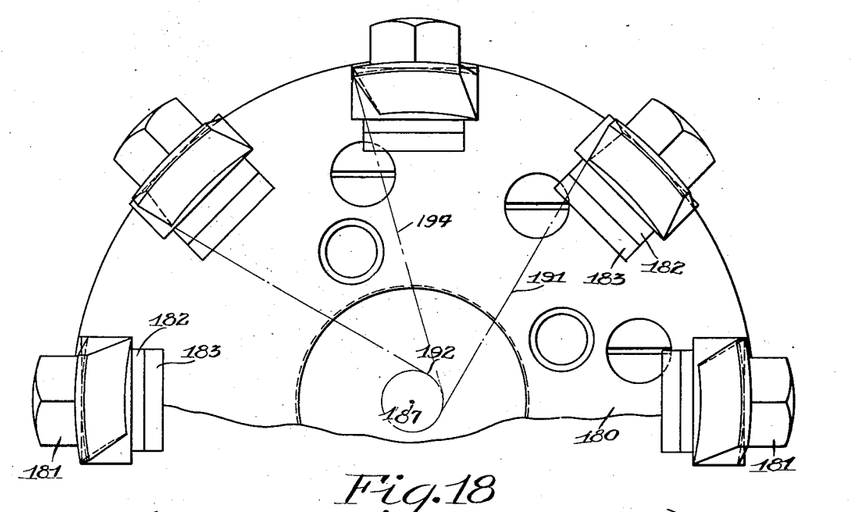
Figure 18 is a plan view of a cutter constructed according to the invention and having blades which are of negative pressure angle on one side.
Figure 19:
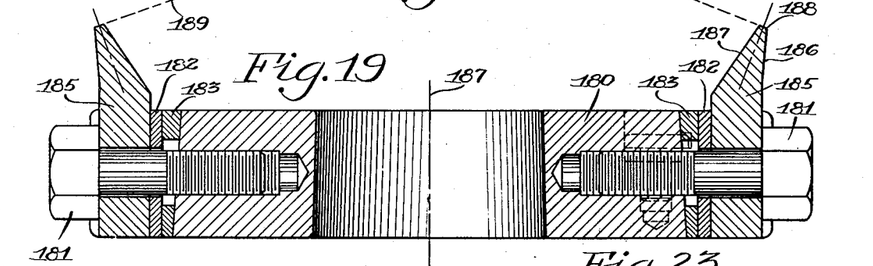
Figure 19 is a sectional view of this cutter, the section corresponding to that of Figures 15 and 17.
Figures 20, 21, 22:
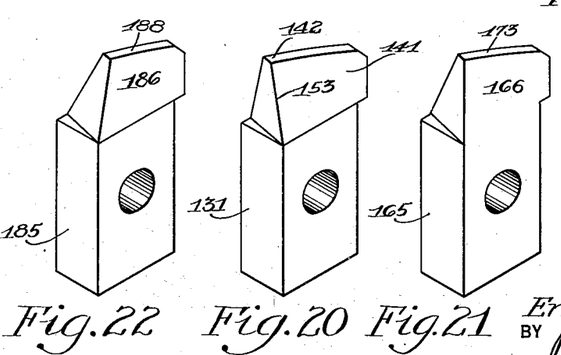
Figure 20 is a perspective view of one of the blades of the cutter shown in Figures 14 and 15.
Figure 21 is a perspective view of one of the blades of the cutter shown in Figures 16 and 17.
Figure 22 is a perspective view of one of the blades of the cutter shown in Figures 18 and 19.

In the cutter of Figures 14 and 15, the outside surfaces of the cutting blades have a positive pressure angle. In the cutter of Figures 16 and 17, the pressure angle of the outside surfaces of the blades is zero while in the cutter of Figures 18 and 19, the outside surfaces of the cutting blades have a negative pressure angle. The cutter head 180 in this last cutter may be identical in construction with the cutter heads 130 and 160 already described and the blades are secured in the cutter head by bolts 181 and adjusted by shims 182 and wedges 183, as in the embodiments already described. In the cutter of Figures 18 and 19, the outside surfaces 186 of the cutting blades 185 are inclined to the axis 187 of the cutter at a negative angle, that is, the outside surfaces 186 of the blades incline inwardly with reference to the axis of the cutter from their tips to their base portions. Both the inside and outside surfaces 186 and 187, respectively, of the cutting blades 185 are relieved and relieved preferably on arcs of circles from front to back. The tip surfaces 188 of the cutting blades are also relieved from front to back and, as before, these tip surfaces are preferably so ground that their outermost points lie in planes 189 inclined to the axis 187 of the cutter at an acute angle.

In the cutter shown in Figures 18 and 19, alternate blades have oppositely directed cutting edges. Preferably, as before, these blades are so sharpened that the cutting edges are non-radial of the axis of the cutter. The inside cutting edges lie in planes 191 tangent to the circle 192 circumscribed about the axis of the cutter as a center while the outside cutting edges lie in planes 194 tangent to this same circle 192.

Figure 23:
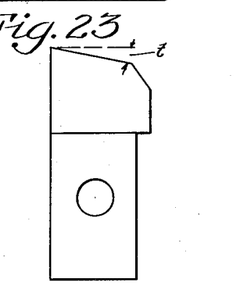
Figure 23 is a side view of a blade of one of the cutters showing how the blades are relieved at their tips.

Figure 23 is a view which might be considered a side elevation of any one of the blades 131, 165 or 185. Each of the blades has, as stated, its tip relieved to provide top clearance indicated at $t$. The amount of this clearance will vary, however, with the type of blade, that is, depending upon the pressure angles on the two sides of the blade. It will be noted that in each of the several modifications illustrated, the rear ends of the cutting blades lie behind the front ends of the blades in the circumferential direction of the cutter. Moreover, since these blades are preferably relieved in the same manner as are blades of a standard face mill gear cuter, like blades of a standard face mill gear cutter, each top edge of each blade will be from front to rear at a constant radial distance from the center of the cutter.

In use, the cutter, whether it be constructed according to either of the described embodiments of my invention or any other possible embodiment thereof, is rotated continuously in intermeshing engagement with the gear blank, the blank being given simultaneously a continuous indexing rotation.

Figures 24, 25, 26, 27, 28, 29, 36, 37:
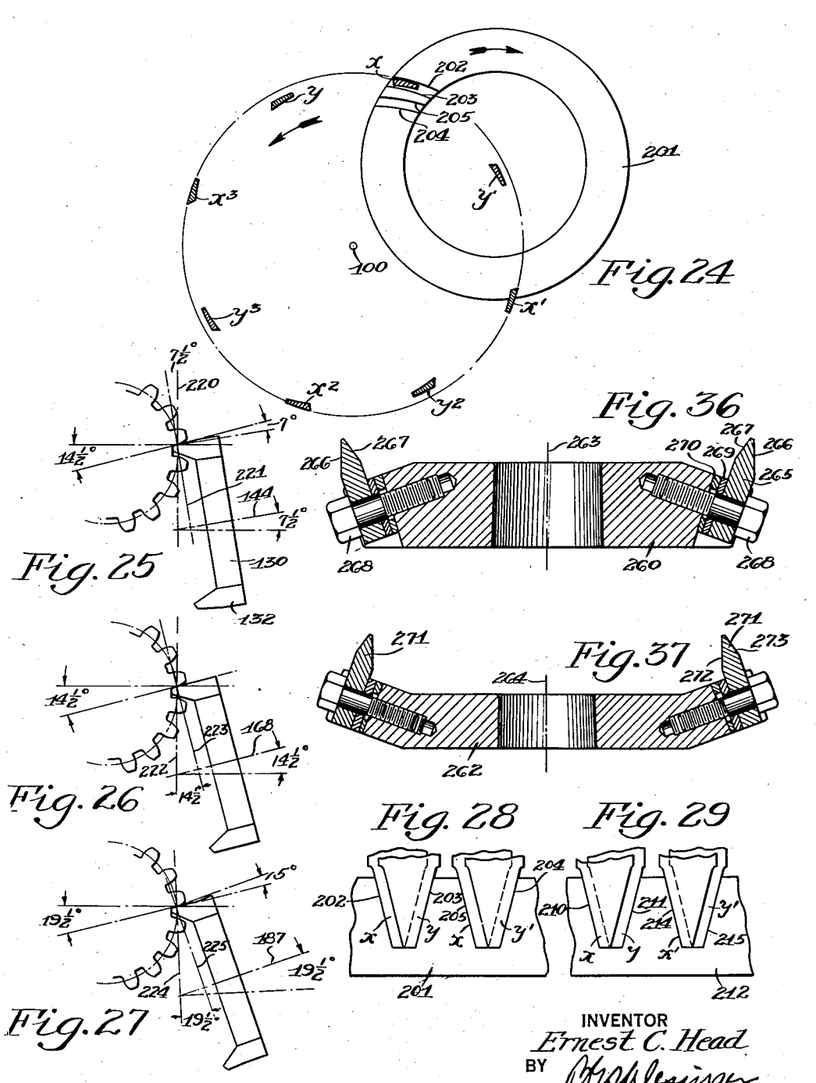
Figure 24 is a diagrammatic view illustrative of the process of cutting a gear according to this invention and showing particularly the cutting of a bevel gear.
Figure 25 is a diagrammatic view showing how the cutter of Figures 14 and 15 is tilted with reference to the blank to cut a tooth of the desired pressure angle on the blank.
Figure 26 is a similar view showing how the cutter of Figures 16 and 17 must be tilted to produce a tooth of the same pressure angle.
Figure 27 is a similar diagrammatic view, showing how the cutter of Figures 18 and 19 must be tilted to produce a tooth of this same pressure angle.
Figure 28 is a diagrammatic view showing one way in which the blades may be arranged in a cutter head to take their successive cuts.
Figure 29 is a similar view illustrating the result obtained when a different arrangement of the blades is made.
Figures 36 and 37 are sectional views of a gear and pinion cutter, respectively, constructed according to this invention, showing a further possible construction of the cutter head and a further way in which the cutting blades may be adjusted on a cutter head built according to this invention.

There are two ways of spacing and arranging the blades illustrated in the drawings. One of these is shown in Figures 24 and 28, the other in Figure 29. In Figure 24, the center of the cutter is indicated at 200 and the cutter is provided with outside cutting blades designated by the letter $x$ and with inside cutting blades designated by the letter $y$. The inside and outside cutting blades alternate and their radial arrangement is such that the inside cutting blades $y$ operate ahead of the outside cutting blades $x$ in cutting the two sides of each tooth space of the blank. In Figure 24, the outside cutting blade $x$ is shown cutting the side tooth surface 202 of a tooth space of the bevel gear blank 201. The preceding inside cutting blade $y$ has previously cut the adjacent tooth surface 203. As the blank and cutter rotate together, the inside cutting blade $y'$ will engage the blank and cut the tooth surface 204 and then subsequently the outside cutting blade $x'$ will cut the adjacent tooth surface 205. So the blank and cutter rotate together until all of the tooth surfaces of the blank have been finished.

By a different radial arrangement of the cutting blades, the blades can be made to operate so that the outside cutting blade cuts first and then an inside cutting blade, the two operating successively upon the adjacent side tooth faces of a tooth space of a blank. This arrangement of the blades is illustrated diagrammatically in Figure 29. Here the blade $x$ operates on the side tooth face 210 and is followed by the blade $y$ which operates on the tooth surface 211. In the further rotation of the blank 212 and the cutter together, the blade $x'$ operates on the tooth surface 214 and the blades $y'$ on the tooth surface 215 of the blank.

As already described, in order to secure equal pressure angles on the two sides of the gear teeth, cutters constructed according to my invention must be tilted in the gear cutting machine. If we assume that gears of 14½° pressure angle are to be cut, then the cutting blades should have an included angle of 29°. If the cutter is of the type shown in Figures 14 and 15, with positive pressure angles on both sides of the blades, the low pressure angle side 141 of the blades might have a pressure angle or inclination to the axis of the cutter, for instance, of 7°. The other side 140 of the blade would then have a pressure angle or inclination to the axis 144 of the cutter of 22°. The cutter would then be tilted 7½° with reference to the pitch plane 220 (Fig. 25) with the result that the sides 141 and 142 of the cutter blades would both have effective cutting pressure angles of 14½° and would, therefore, produce tooth surfaces of the desired pressure angle.

If the cutter is of the type shown in Figures 16 and 17, that is with a zero pressure angle on the outside surfaces of its blades, the angle included between the sides 166 and 170 of the blades should still be 29° for gears having teeth of 14½° pressure angle on both sides. Since the pressure angle of the outside of the blades is zero, the pressure angle of the inside surface of the blades must be 29°. To cut a gear of 14½° pressure angle, the cutter must be tilted 14½° with reference to the pitch plane 222 (Fig. 26).

The cutters shown in Figures 18 and 19 have a negative pressure angle on the outside surfaces of the blade. This angle may be, for instance, −5°. The included angle between the sides 186 and 187 of the blades will still equal 29° but the pressure angle of the side 187 must equal 34° and the cutter must be tilted 19½° with reference to the pitch plane 224 (Fig. 27). The lines 221, 223 and 225 in Figures 25, 26 and 27, respectively, indicate planes perpendicular to the axes 144, 168 and 187 of the respective cutters.

Figure 34:
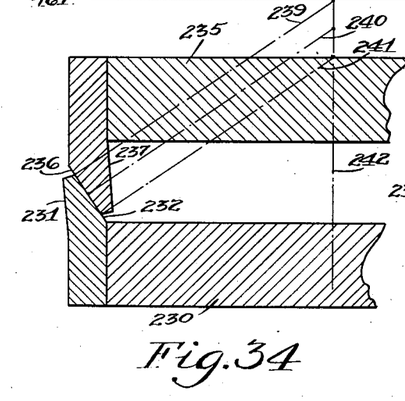
Figures 34 and 35 are diagrammatic views showing the complementary relation between the gear and pinion cutters required to cut a pair of theoretically correct gears according to this invention, Figure 34 showing the complementary relation between the inside blades of the gear cutter and the outside blades of the pinion cutter and Figure 35 showing the complementary relation existing between the outside blades of the gear cutter and the inside blades of the pinion cutter.
Figure 35:
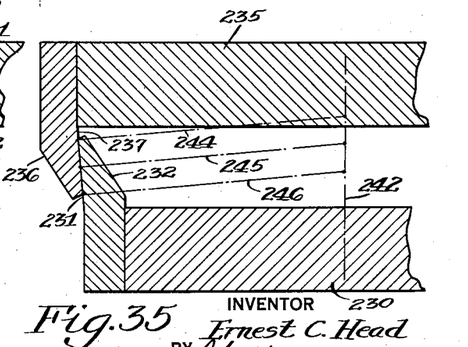

To cut truly conjugate gears, the gear and pinion of a pair must be cut with truly complementary cutters. So if a cutter 230 which has a negative pressure angle on the outsides 231 of the blades and a large positive pressure angle on the insides 232 of the blades, is used to cut the gear, a cutter 235 which has a large positive pressure angle on the outsides 236 of the blades and a negative pressure angle on the insides 237 of its blades should be used to cut the pinion. Moreover, the inside cutting edges 232 of the blades of the cutter 230 should be exactly complementary to the outside cutting edges 236 of the cutter 235 and vice versa the outside cutting edges of the cutter 230 should be exactly complementary to the inside cutting edges 236 of the cutter 235 if the pair of gears to be cut are to be truly conjugate. The lines 239, 240 and 241 indicate radii of curvature of the surfaces 236 and 231 at three different points on these surfaces, the line 242 designating the common axis of the gear and pinion cutters 230 and 235. In like manner, the lines 244, 245 and 246 designate radii of curvature of the surfaces 231 and 237 at three different points on these complementary surfaces.

To get the desired pressure angles on the gear and pinion, the gear cutter is tilted in one direction and the pinion cutter in the opposite direction. This is clearly shown in Figures 30 to 32 inclusive which illustrate the cutting of a pair of spiral bevel gears. Here the gear cutter 250 has outside cutting edges of zero pressure angle while the pinion cutter 252 has inside cutting edges of zero pressure angle and the two cutters are complementary. The bevel gear 254 is cut by tilting the cutter 250 in one direction to the pressure angle of the gear teeth to be produced and by rotating the cutter continuously in intermeshing engagement with the blank while imparting a continuous indexing rotation to the blank. A generating roll may or may not be imparted in addition, depending upon whether the gear is to have generated tooth profiles or not. The pinion 255 is cut by tilting the pinion cutter 252 in the opposite direction from the gear cutter 250 but to the pressure angle of the pinion tooth to be cut. Then the cutter 252 is rotated continuously in intermeshing engagement with the pinion blank 255 while a continuous indexing rotation is imparted to the blank. A generating roll may be imparted, in addition, between the cutter and the pinion blank, if generated tooth profiles are desired.

Figure 30:
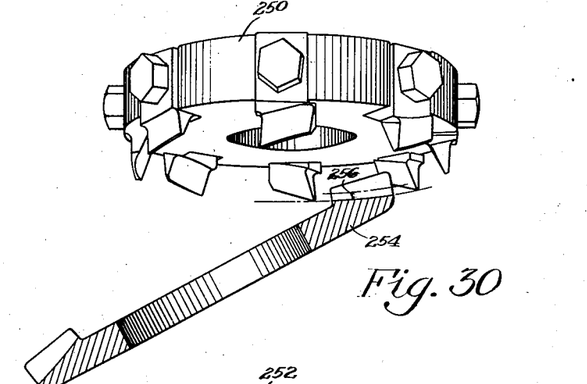
Figures 30 and 31 are views further illustrative of the relations between the cutting tools and the gear and pinion blanks, respectively, when cutting a pair of bevel gears according to this invention.
Figure 31:
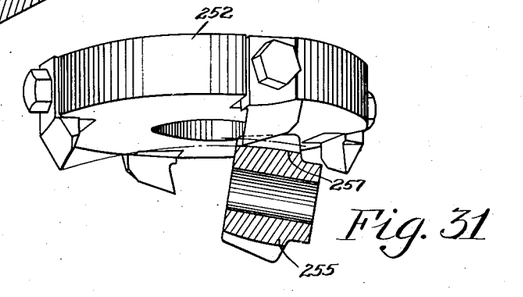
Figures 32, 33:
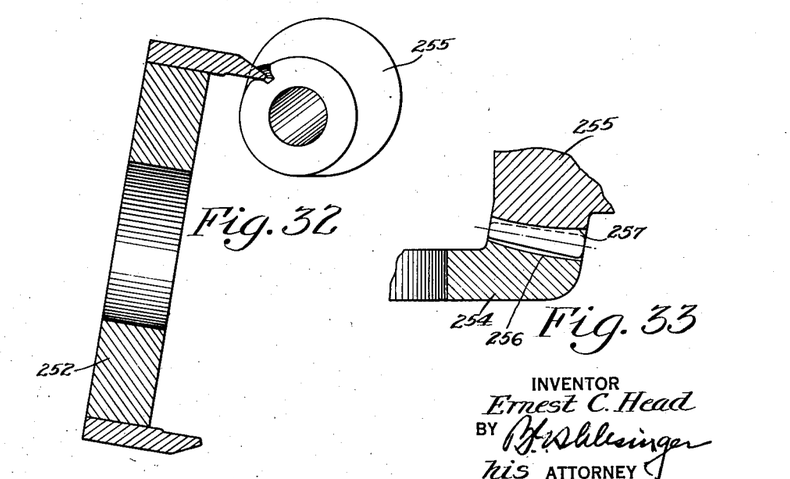
Figure 32 is a view of the cutter and pinion blank shown in Figure 31, the view being taken in an axial plane of the cutter.
Figure 33 is a fragmentary sectional view of a pair of bevel gears produced according to this invention.

Due to the tilt of the cutters in cutting gears and pinion, the tooth spaces of the two gears will have curved bottoms. However, due to the fact that the two cutters are tilted in opposite directions, the bottoms 256 of the tooth slots of the gear will be concavely curved while the bottoms 257 of the tooth spaces of the pinion will be convexly curved. The continous indexing rotation of the blanks combined with the rotation of the cutters will produce teeth on the two gears which are curved longitudinally on arcs of roulettes as described in Patent No. 1,249,378 above mentioned.

A fragmentary sectional view of the pair of spiral bevel gears in mesh is shown in Figure 33.

Instead of making the blades radially adjustable on the cutters, cutters may be constructed according to this invention as illustrated in Figures 36 and 37. 260 designates the gear cutter and 262 the pinion cutter. The blade receiving slots are inclined to the axes 263 and 264 of the respective cutters at angles corresponding to the angles to which the cutters must be tilted. In the cutter shown, the blades 265 of the gear cutter have outside cutting edges 266 which are of zero pressure angle and inside cutting edges 267 which are inclined to the axis 263 of the cutter at an angle equal to twice the pressure angle of the tooth surfaces to be cut. The blades are secured in the cutter heads as before by bolts 268 but are adjustable in a direction inclined at an acute angle to the axis 263 of the cutter by the removable shims 269 and the wedges 270. The arrangement is such that when the cutter 260 is titled to produce the desired pressure angle on the teeth of the gear blank, the blades can be adjusted in a direction parallel to the pitch plane to change the effective cutting radius of the blades without changing the effective cutting height of the blades.

The pinion cutter has blades 271 which have inside cutting edges 272 of zero pressure angle and outside cutting edges 273 which are inclined to the axis 264 of the cutter at an angle equal to twice the pressure angle. Here the blades are positioned in slots which are inclined to the axis 264 of the cutter but at the opposite angle from the blades of the gear cutter 260 and for the reason that the pinion cutter is tilted in the opposite direction to the gear cutter. As before, when the pinion cutter has been adjusted into the correct angular relation with reference to the pinion blank, this construction permits of adjusting the blades 271 of the cutter in a direction parallel in the pitch plane to change their effective radial cutting positions without changing the effective cutting heights.

The present invention is applicable, to the cutting of spur, bevel and hypoid gears and while the invention has been described particularly with reference to the method of cutting truly conjugate gears, it will be understood that the various methods practiced at present for localizing tooth bearing, modifying profile curvature etc. are applicable also, when cutting according to the present invention and that the theoretically correct method of cutting may be modified accordingly. It will be understood, also, that while several different embodiments of the invention have been described, the invention is capable of further modification. In general it may be said that the present application is intended to cover any adaptations, uses, or embodiments of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A gear cutter comprising a head or support adapted to be rotated and a plurality of annularly arranged cutting blades which are secured thereto in spaced relation for successive engagement with different teeth of the blank, said blades having their cutting portions extending beyond the adjacent side face of the head in the general direction of the axis of the head and being formed with side cutting edges whose inclination to the axis of the cutter is less than the pressure angle of the teeth of the gears to be cut, said blades being so formed that all points in a top cutting edge of a blade are at a constant radial distance from the axis of the cutter.

2. A gear cutter comprising a head or support adapted to be rotated and a plurality of annularly arranged cutting blades which extend from the head in the general direction of the axis of the head and are spaced apart for successive engagement with different teeth of the blank, alternate blades being formed with side cutting edges on opposite sides, the side cutting edges of one side being inclined to the axis of the cutter at an angle less than the pressure angle of the teeth of the gear to be cut and the opposite side cutting edges being inclined to the axis of the cutter at an angle greater than the pressure angle of the gear to be cut, the included angle between opposite side cutting edges equaling the angle between opposite sides of the teeth of the gear to be cut, and said blades being so formed that all points in a top edge of a blade are at a constant radial distance from the axis of the cutter.

3. A gear cutter comprising a head or support adapted to be rotated and a plurality of annularly arranged cutting blades which extend from the head in the general direction of the axis of the head and are spaced apart for successive engagement with different teeth of the blank, each of said blades being relieved on one side and the tip but having its opposite side unrelieved, the unrelieved sides of the blades having a smaller pressure angle than the tooth surfaces to be cut thereby, and each of said blades being so formed that all points in a top edge of a blade are at a constant radial distance from the axis of the cutter.

4. A gear cutter comprising a head or support adapted to be rotated and a plurality of annularly arranged cutting blades which extend from the head in the general direction of the axis of the head and are spaced apart for successive engagement with different teeth of the blank, each of said blades having one side face which is formed from front to back as a section of a cylinder coaxial with the cutter head and a side cutting edge formed by the intersection of one side of the blade with the front face thereof, and each of said blades being so formed that all points in a top edge of a blade are at a constant radial distance from the axis of the cutter.

5. A gear cutter comprising a head or support adapted to be rotated and a plurality of annularly arranged cutting blades which extend from the head in the general direction of the axis of the head and are spaced apart for successive engagement with different teeth of the blank, each of said blades having one side and its top relieved and its opposite side formed from front to back as a section of a cylinder whose axis coincides with the axis of the cutter and each of said blades having a cutting edge formed by the intersection of one side face of the blade with the front face thereof.

6. A gear cutter comprising a head or support adapted to be rotated and a plurality of annularly arranged cutting blades which extend beyond the adjacent face of the head in the general direction of the axis of the head, and which are spaced apart for successive engagement with different teeth of the blank, each of said blades having cutting portions whose sides are relieved on the arcs of circles from front to back, said blades being formed so that all points in a top edge of a blade are at a constant radial distance from the axis of the cutter certain of said blades being formed with outside cutting edges and other of said blades with inside cutting edges and the side cutting edges of one side being inclined to the axis of the cutter at an angle less than the pressure angle of the gear to be cut while the opposite side cutting edges are inclined to the axis of the cutter at an angle greater than the pressure angle of the gear to be cut whereby when the cutter is adjusted to cut tooth surfaces of the required pressure angle on the blank and the cutter and blank are rotated together in timed relation with the blank rotating away from the sides of the blades which have a pressure angle less than the required pressure angle, the blades will have cutting clearance with reference to the tooth surfaces to be cut thereby.

7. A gear cutter comprising a head or support adapted to be rotated and a plurality of annularly arranged cutting blades secured thereto in spaced relation for successive engagement with different teeth of a gear blank, said blades having their cutting portions extending beyond adjacent side faces of the head in the general direction of the axis of the head and their cutting edges inclined to the axis of the cutter at an angle different from the pressure angle of the gear teeth to be cut and being adjustable in a direction other than at right angles to the axis of the cutter, and each of said blades being so formed that its rear end lies behind the front end in the circumferential direction of the cutter.

8. A gear cutter comprising a head or support adapted to be rotated and having a recess or slot in its periphery the inside wall of which is inclined to the axis of the cutter, a blade having a base portion engaging in said recess and having a cutting edge extending beyond said head whose pressure angle differs from the pressure angle of the tooth surface to be cut thereby and an adjustable member between the base portion of said blade and the opposed wall of the recess and adjustable transversely of the head in a direction inclined to the axis of the head to adjust the blade on the head in a direction inclined at an acute angle to the axis of the cutter.

9. A cutting blade for a rotary face-mill gear cutter, said blade having its tip and one side face relieved and its other side unrelieved and formed as a section of a cylinder and said blade having a side cutting edge formed by the intersection of one side of the blade with the front face of the blade.

10. The method of cutting gears which comprises employing a rotary cutter having a plurality of annularly arranged cutting blades which have cutting edges at one side inclined to the axis of the cutter at an angle different from the pressure angle of the tooth surfaces to be cut thereby, adjusting said cutter into engagement with a gear blank so that said side cutting edges are inclined to the blank to cut tooth surfaces thereon of the desired pressure angle, and rotating the cutter and blank continuously on their axes in timed relation to cause different blades of the cutter to engage successively different teeth of the blank, the directions of rotation of the cutter and blank being selected in accordance with the pressure angle of the cutting edges of the blades to insure the required cutting clearance for the blades.

11. A cutting blade for a rotary face mill gear cutter having one side face formed as a section of a cylinder and having its other side face relieved along an arc of a circle and also having its tip relieved and said blade having a side cutting edge formed by the intersection of one side of the blade with the front face thereof.

12. A gear cutter comprising a head or support adapted to be rotated and a plurality of annularly arranged cutting blades which are secured thereto in spaced relation for successive engagement with different teeth of a blank, said blades having their cutting portions extending beyond the adjacent side face of the head in the general direction of the axis of the head, and being formed with side cutting edges, the cutting edges of the sides of the blades which rotate into side tooth surfaces of the blank during cutting having pressure angles greater than the pressure angle of said side tooth surfaces and the cutting edges of the sides of the blades which rotate away from the side tooth surfaces of the blank during cutting having pressure angles less than the pressure angle of said side tooth surfaces.

13. The method of cutting gears which comprises employing a rotary cutter having a plurality of cutting blades arranged in spaced relation and extending therefrom in the general direction of the axis of the cutter, said blades having side cutting edges for cutting opposite side tooth faces of a blank, the cutting edges for cutting one side face of the blank being inclined to the axis of the cutter at a greater angle than the pressure angle of the tooth side to be cut thereby and the cutting edges for cutting the opposite side face of the blank being inclined to the axis of the cutter at a smaller angle than the pressure angle of the tooth sides to be cut thereby, positioning said cutter so that the opposite side cutting edges are inclined to a plane tangent to the pitch surface of the blank in accordance with the pressure angle of the tooth surfaces to be cut thereby, and rotating the cutter in engagement with the blank while simultaneously imparting a continuous indexing rotation to the blank, the directions of rotation of the cutter and blank being so selected that the blank rotates away from the sides of the cutting blades which are of smaller pressure angle and into the sides of the cutting blades which are of the larger pressure angle.

14. The method of cutting gears which comprises employing a cutter provided with a plurality of spaced cutting blades which extend in the general direction of the axis of the cutter and which have one side face formed as a section of a cylinder whose axis is parallel to the axis of the cutter, and opposite side cutting edges on opposite sides for cutting opposite side tooth faces of a blank, the included angle between opposite side cutting edges being equal to the included angle between adjacent side faces of the teeth to be cut, positioning said cutter so that the side cutting edges are inclined to a plane tangent to the pitch surface of the blank in accordance with the pressure angle of the tooth surfaces to be cut thereby, and rotating the cutter in engagement with the blank while simultaneously imparting a continuous indexing rotation to the blank, the directions of rotation of the blank and cutter being so selected that the blank rotates away from the cylindrical side of the blades and into the opposite side of the blades.

15. A gear cutter comprising a rotary head and a plurality of annularly arranged cutting blades which are secured to the head in spaced relation for successive engagement with different teeth of a gear blank, each of said blades having its median line inclined to the axis of the cutter and its tip lying in a plane inclined at an acute angle to the axis of the cutter, each of said blades having a cutting edge whose pressure angle differs from the pressure angle of the tooth surface to be cut thereby, and each of said blades having its rear end lying behind its front end in the circumferential direction of the cutter.

16. A gear cutter comprising a rotary head and a plurality of angularly arranged cutting blades which are secured to the head in spaced relation for successive engagement with different teeth of a gear blank, alternate blades being formed with side cutting edges on opposite sides, the side cutting edges of one side being inclined to the axis of the cutter at an angle less than the pressure angle of the teeth of the gear to be cut and the opposite side cutting edges being inclined to the axis of the cutter at an angle greater than the pressure angle of the gear to be cut, the included angle between said side cutting edges equalling the included angle between opposite tooth sides of the gear to be cut, each of said blades having its tip lying in a plane inclined at an acute angle to the axis of the cutter and each of said blades having its rear end lying behind its front end in the circumferential direction of the cutter.

17. A gear cutter comprising a rotary head and a plurality of annularly arranged cutting blades which are secured thereto in spaced relation for successive engagement with different teeth of the gear blank and which are relieved on at least one side face on arcs of circles from front to back and which have their inside and outside cutting edges at different radial distances from the axis of the cutter, their median lines inclined to the axis of the cutter and their tips lying in planes inclined at an acute angle to the axis of the cutter.

18. A gear cutting blade having its tip inclined at an acute angle to one side face and at an obtuse angle to the other side face and having its tip and one side face relieved and its other side face formed as a section of a cylinder.

19. A gear cutter comprising a rotary head and a plurality of annularly arranged cutting blades which are secured thereto in spaced relation for successive engagement with different teeth of a gear blank, said blades having opposite side cutting edges, the cutting edges of the sides of the blades, which rotate into the side tooth surfaces of the blank during cutting, having pressure angles greater than the pressure angles of said side tooth surfaces, and the cutting edges of the sides of the blades, which rotate away from the side surfaces of the blank during cutting, having pressure angles less than the pressure angle of said side tooth surfaces, each of said blades having its tip surface in a plane inclined at an acute angle to the axis of the cutter.

20. A gear cutter comprising a rotary head and a plurality of annularly arranged cutting blades which are secured to the head in spaced relation for successive engagement with different teeth of a gear blank, each of said blades having one side face formed from front to back as a section of a cylinder, the elements of which are parallel to the axis of the head, and each of said blades having the opposite side face and its tip relieved and its tip surface lying in a plane inclined at an acute angle to the axis of the cutter.

21. The method of cutting a gear which comprises employing a rotary cutter having a plurality of annularly arranged cutting blades whose rear ends lie behind their front ends circumferentially of the cutter and whose side cutting edges are inclined at different angles to the axis of the cutter, positioning said cutter in engagement with a gear blank so that side cutting edges at one side of the blade are inclined to a plane tangent to the pitch surface of the blank at an angle equal to the pressure angle of the tooth surfaces to be cut thereby and rotating the cutter in engagement with the blank while simultaneously imparting a continuous indexing rotation to the blank to cause different blades of the cutter to engage successively different teeth of the blank, the direction of rotation of the cutter and blank being so selected that the blank rotates away from the sides of the cutting blades which are less inclined to the axis of the cutter and into the sides of the blades which are more inclined to the axis of the cutter.

ERNEST C. HEAD.